United States Patent
Wu et al.

(10) Patent No.: US 9,288,075 B2
(45) Date of Patent: Mar. 15, 2016

(54) METHOD AND SYSTEM FOR AUTO-CONFIGURATION, AND NETWORK NODE

(75) Inventors: Guangrui Wu, Nanjing (CN); Hao Qi, Nanjing (CN); Ying Xie, Nanjing (CN); Yinwei Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 13/555,922

(22) Filed: Jul. 23, 2012

(65) Prior Publication Data

US 2013/0132499 A1 May 23, 2013

(30) Foreign Application Priority Data

Nov. 22, 2011 (CN) .......................... 2011 1 0373405

(51) Int. Cl.
*H04L 12/46* (2006.01)
*H04L 12/24* (2006.01)

(52) U.S. Cl.
CPC ........ *H04L 12/4641* (2013.01); *H04L 41/0816* (2013.01); *H04L 41/0889* (2013.01); *H04L 41/0886* (2013.01)

(58) Field of Classification Search
None
See application file for complete search history.

(56) References Cited

U.S. PATENT DOCUMENTS

| | | | |
|---|---|---|---|
| 5,914,957 A | 6/1999 | Dean et al. | |
| 7,672,318 B2 * | 3/2010 | Halen | 370/401 |
| 7,760,668 B1 * | 7/2010 | Zinjuvadia | 370/256 |
| 7,787,399 B2 * | 8/2010 | Chu et al. | 370/256 |
| 7,886,080 B2 * | 2/2011 | Sajassi et al. | 709/242 |
| 7,933,266 B2 * | 4/2011 | Zadikian et al. | 370/389 |
| 8,400,957 B2 * | 3/2013 | French et al. | 370/315 |
| 8,488,482 B2 * | 7/2013 | Clave et al. | 370/252 |
| 8,599,850 B2 * | 12/2013 | Jha et al. | 370/390 |
| 8,737,399 B2 * | 5/2014 | Yong | 370/392 |
| 8,743,875 B2 * | 6/2014 | Khera et al. | 370/390 |
| 8,750,141 B2 * | 6/2014 | Skalecki et al. | 370/252 |
| 8,798,055 B1 * | 8/2014 | An | H04L 49/604 370/390 |
| 2006/0153156 A1 | 7/2006 | Wentink et al. | |
| 2007/0206513 A1 * | 9/2007 | Cho et al. | 370/254 |
| 2008/0144644 A1 * | 6/2008 | Allan et al. | 370/401 |
| 2008/0240118 A1 * | 10/2008 | Roy et al. | 370/400 |

(Continued)

FOREIGN PATENT DOCUMENTS

| | | |
|---|---|---|
| CN | 101084687 A | 12/2007 |
| CN | 102084622 A | 6/2011 |

OTHER PUBLICATIONS

Chinese Patent No. 102387042, issued on Mar. 12, 2014, granted in corresponding Chinese Patent Application No. 201110373405.6, 1 page.

(Continued)

*Primary Examiner* — Greg C Bengzon
(74) *Attorney, Agent, or Firm* — Brinks Gilson & Lione (57) ABSTRACT

Embodiments of the present disclosure provide a method, system and network node for auto-configuration, and a network node. A network node in a BVLAN receives IS-IS protocol packets sent by other network nodes in the BVLAN; determines its own priority in the BVLAN; transmits uniform configuration information in the BVLAN according to its own priority, where the uniform configuration information is information that needs to be configured on each network node in the BVLAN. In the embodiments of the present disclosure, auto-configuration may be performed on the network node, thereby improving a speed and accuracy of configuration.

6 Claims, 3 Drawing Sheets

(56) References Cited

U.S. PATENT DOCUMENTS

| | | | |
|---|---|---|---|
| 2009/0144403 A1* | 6/2009 | Sajassi et al. | 709/223 |
| 2010/0020797 A1* | 1/2010 | Casey et al. | 370/390 |
| 2011/0007667 A1* | 1/2011 | Takacs et al. | 370/254 |
| 2011/0131301 A1 | 6/2011 | Klein et al. | |
| 2011/0131302 A1* | 6/2011 | Bulusu et al. | 709/221 |
| 2011/0216672 A1* | 9/2011 | Thottakkara et al. | 370/256 |
| 2011/0228780 A1* | 9/2011 | Ashwood-Smith et al. | 370/392 |
| 2012/0016973 A1* | 1/2012 | Haris et al. | 709/220 |
| 2012/0213117 A1* | 8/2012 | Banerjee et al. | 370/254 |
| 2012/0224588 A1* | 9/2012 | Germain et al. | 370/401 |
| 2013/0018979 A1* | 1/2013 | Cohen et al. | 709/217 |
| 2013/0021947 A1* | 1/2013 | Sultan et al. | 370/254 |
| 2013/0077626 A1* | 3/2013 | Keesara et al. | 370/390 |
| 2013/0107887 A1* | 5/2013 | Pearson et al. | 370/401 |
| 2013/0194973 A1* | 8/2013 | Farkas et al. | 370/255 |
| 2013/0254356 A1* | 9/2013 | Eastlake, III | 709/220 |

OTHER PUBLICATIONS

Extended European Search Report issued in corresponding European Patent Application No. 12177553.0, mailed Mar. 4, 2013.

Allan et al., "Shortest Path Bridging: Efficient Control of Larger Ethernet Networks" IEEE Communications Magazine, Oct. 2010.

Office Action (including English Translation) issued in corresponding Chinese Patent Application No. 201110373405.6; mailed Jun. 13, 2013.

"Virtual Bridged Local Area Networks—Amendment <>: Shortest Path Bridging" LAN/MAN Standards Committee of the IEEE Computer Society. Institute of Electrical and Electronics Engineers, Inc. Sep. 21, 2011:1-296.

* cited by examiner

METHOD AND SYSTEM FOR AUTO-CONFIGURATION, AND NETWORK NODE

CROSS-REFERENCE TO RELATED APPLICATION

This application claims priority to Chinese Patent Application 201110373405.6, filed on Nov. 22, 2011, which is hereby incorporated by reference in its entirety.

FIELD

Embodiments of the present disclosure relate to the field of communications technologies, and specifically, to a method for performing auto-configuration in a network, a network node for implementing the method, and a system for auto-configuration.

BACKGROUND 802.1aq is a new protocol for constructing a large-scale layer 2 network. An 802.1aq network usually includes many nodes, generally as many as 500 to 1000 nodes. According to a requirement of the current 802.1aq, some configuration information of all the nodes in the network is required to be consistent in the entire network, and these configuration information includes, for example, a BVLAN/ECT-ALG (Backbone Virtual Local Area Network/Equal Cost Tree Algorithms, backbone virtual local area network/equal cost tree algorithm) mapping relationship, and an ISID/BVLAN (I-component service Identity/BVLAN, I-component service Identity/backbone virtual local area network) mapping relationship. If the configuration information is inconsistent, it may result in interruptions of some services in the network. That is to say, if the configuration information (such as the BVLAN/ECT-ALG mapping relationship) of two nodes in the network is inconsistent, it may result in unavailability of a link between the two nodes, thereby blocking a service in the network.

Currently, in order to synchronize configuration in the network, the nodes need to be manually configured one by one, so as to ensure integrity and consistency of the configuration artificially. It can be seen that, if an uninterrupted service can only be ensured by manual configuration, a configuration workload is excessive. In addition, a speed of a manual configuration process is limited, while no fully usable status of services can be implemented before the configuration of all the nodes in the network is completed. Moreover, if an artificial configuration error occurs in the manual configuration process, it is difficult to locate a node where the configuration error occurs.

SUMMARY

Embodiments of the present disclosure provide a method, system and network node for auto-configuration, so as to solve a problem that manual configuration at present has a low speed and long service interruption time in a configuration process, and the configuration is error-prone.

In one aspect, an embodiment of the present disclosure provides a method for auto-configuration, which includes: receiving, by a network node in a BVLAN, intermediate system to intermediate system routing protocol (IS-IS) (Intermediate System to Intermediate System Routing Protocol) protocol packets sent by other network nodes in the BVLAN; and determining, by the network node, its own priority in the BVLAN; and transmitting, by the network node, uniform configuration information in the BVLAN according to its own priority, where the uniform configuration information is information that needs to be configured on each network node in the BVLAN.

In another aspect, an embodiment of the present disclosure provides a network node, which includes: a transmitting unit and a determining unit, where the transmitting unit is configured to receive IS-IS protocol packets sent by other network nodes in a BVLAN, where all the network nodes in the BVLAN support transmission of IS-IS protocol packets; and the determining unit is configured to determine a priority of the network node in the BVLAN. The transmitting unit is further configured to enable the network node to transmit uniform configuration information in the BVLAN according to the priority, where the uniform configuration information is information that needs to be configured on each network node in the BVLAN.

In still another aspect, an embodiment of the present disclosure provides a system for auto-configuration, which includes: a master node and one or multiple slave nodes. The master node and the one or multiple slave nodes are located in an independent BVLAN, and all the network nodes in the BVLAN support transmission of IS-IS protocol packets, where the master node has a highest priority, and sends uniform configuration information to the one or multiple slave nodes through an IS-IS protocol packet, where the uniform configuration information is information that needs to be configured on all the network nodes in the BVLAN.

In the embodiments of the present disclosure, auto-configuration may be performed on the nodes in the network, thereby improving a speed of the configuration and ensuring accuracy of the configuration.

BRIEF DESCRIPTION OF THE DRAWINGS

To illustrate the technical solutions according to the embodiments of the present disclosure more clearly, accompanying drawings for describing the embodiments or the prior art are introduced briefly below. Obviously, the accompanying drawings in the following description are only some embodiments of the present disclosure, and persons of ordinary skill in the art may obtain other drawings from the accompanying drawings without making creative efforts.

DETAILED DESCRIPTION OF THE EMBODIMENTS

The technical solutions according to the embodiments of the present disclosure are clearly and completely described below with reference to the accompanying drawings according to the embodiments of the present disclosure. Obviously, the embodiments described are only part of rather than all of the embodiments of the present disclosure. All other embodiments obtained by persons of ordinary skill in the art based on the embodiments of the present disclosure without making creative efforts shall fall within the protection scope of the present disclosure.

Figure 1:
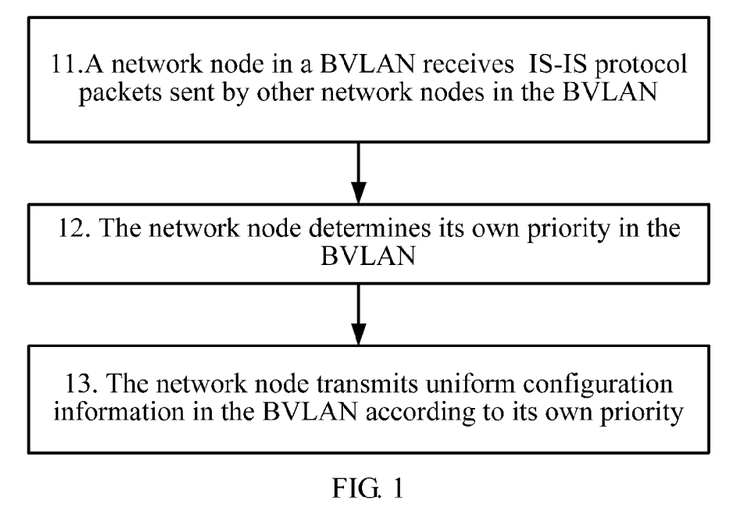
FIG. 1 is a flow chart of a method for auto-configuration according to an embodiment of the present disclosure.

In an embodiment of the present disclosure shown in FIG. 1, a method for implementing auto-configuration on each network node is illustrated in detail.

11: A network node in a BVLAN receives IS-IS protocol packets sent by other network nodes in the BVLAN.

Optionally, before this step, network nodes supporting the IS-IS protocol form an independent BVLAN. Different from a service BVLAN, the independent BVLAN ensures that all the network nodes in the independent BVLAN may transmit IS-IS protocol packets.

12: The network node determines its own priority in the BVLAN.

Optionally, in order to determine priorities of all the network nodes in the BVLAN, the priority of each network node may be determined based on priority information carried in the IS-IS protocol packets. Specifically, a new priority type-length-value (TLV) (Type-Length-Value) may be added to an existing IS-IS protocol packet, and a network node notifies its own priority to other network nodes when broadcasting the IS-IS protocol packet. In other words, for a certain network node, because it is capable of receiving IS-IS protocol packets of other network node except itself, after comparing the priority TLVs in the received IS-IS protocol packets of the other network nodes with its own priority TLV, it may know its own priority in the entire BVLAN.

13: The network node transmits uniform configuration information in the BVLAN according to its own priority.

The network node may make preparation for transmitting the uniform configuration information after knowing its own priority in the independent BVLAN. Specifically speaking, if the network node knows that its own priority is a highest priority in the BVLAN, it determines that it is a master node, and sends the uniform configuration information to other network nodes in the BVLAN. If the network node knows that its own priority is not the highest priority in the BVLAN, it determines that it is a slave node, and receives the uniform configuration information sent by a master node in the BVLAN. The uniform configuration information may be new uniform configuration information configured on the master node, or may be current configuration information of the master node. The master node has qualification to advertise the configuration in the entire network, and therefore the master node sends the uniform configuration information to other network nodes.

The uniform configuration information is information that needs to be configured on each network node in the BVLAN, and usually may include a BVLAN/ECT-ALG (Backbone Virtual Local Area Network/Equal Cost Tree Algorithms, backbone virtual local area network/equal cost tree algorithm) mapping relationship, and an ISID/BVLAN (I-component service Identity/BVLAN, I-component service Identity/backbone virtual local area network) mapping relationship. Optionally, the uniform configuration information may be broadcast in the BVLAN through the IS-IS protocol packet carrying the uniform configuration information TLV.

In conclusion, with the method for auto-configuration according to the embodiment of the present disclosure, auto-configuration may be performed on the nodes in the network, thereby improving a speed and accuracy of the configuration.

Figure 2:
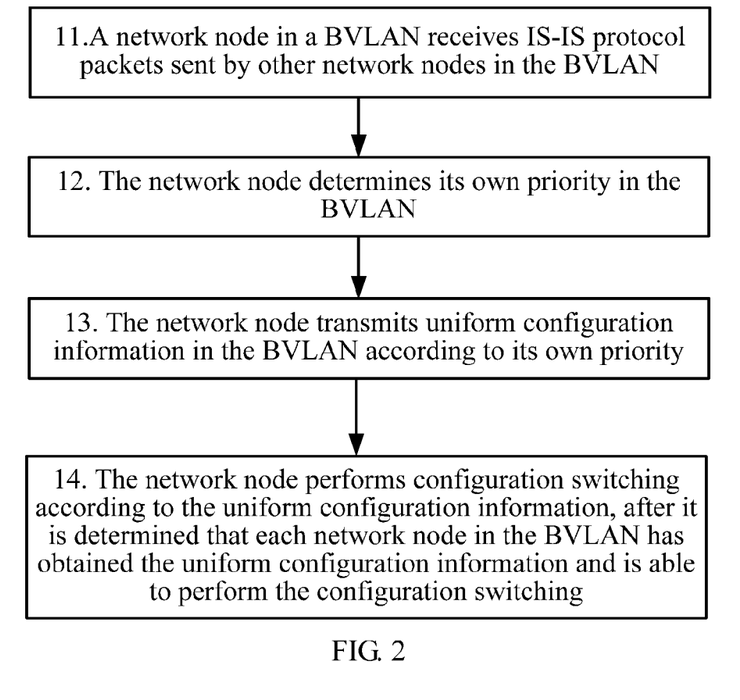
FIG. 2 is a flow chart of a method for auto-configuration according to another embodiment of the present disclosure.

FIG. 2 shows a method for auto-configuration according to another embodiment of the present disclosure.

On the basis of the foregoing embodiment, the method for auto-configuration may further include: 14: the network node performs configuration switching according to the uniform configuration information, that is, old uniform configuration information is changed to the uniform configuration information obtained in transmission.

After receiving the uniform configuration information sent by a master node, a slave node sends acknowledgment information, which is used for indicating that the uniform configuration information is received, to the master node and other slave nodes. After receiving the acknowledgment information sent by all other slave nodes except the master node, each slave node in the BVLAN performs the configuration switching according to the uniform configuration information. For the master node, if the sent uniform configuration information is current configuration information of the master node, the master node does not need to perform the configuration switching; if the uniform configuration information is newly configured, the master node also needs to perform, after receiving the acknowledgment information sent by all other network nodes except itself, the configuration switching.

Before switching, all the network nodes are maintained in old configuration. Synchronous switching is performed only when it is determined that all the network nodes are able to perform the configuration switching, so as to ensure minimum service interruption time.

In addition, if the master node is faulty and cannot send an IS-IS protocol packet to other network nodes, a network node whose original priority is next to a highest priority determines according to a priority TLV that it has the highest priority. That is to say, in the independent BVLAN, when an original master node is faulty, the network node whose priority is next to the highest priority is raised to the master node.

In conclusion, with the method for auto-configuration according to the embodiment of the present disclosure, auto-configuration may be performed on the nodes in the network, thereby improving a speed and accuracy of configuration, and further reducing the service interruption time and ensuring the synchronous configuration switching of all the nodes.

A network node implementing the method for auto-configuration according to the embodiments of the present disclosure is described with reference to FIG. 3 and FIG. 4.

Figure 3:
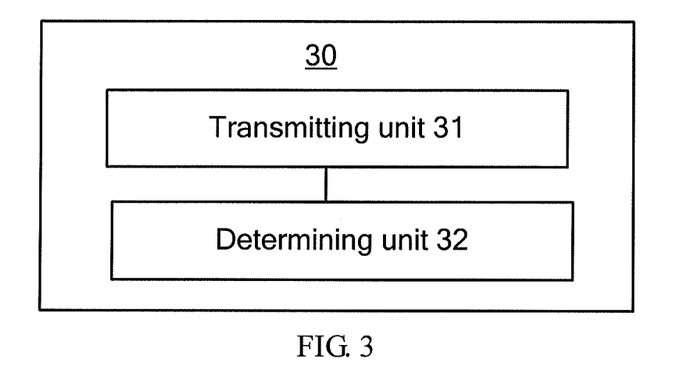
FIG. 3 is a schematic structural diagram of a network node according to an embodiment of the present disclosure.

In FIG. 3, a network node 30 includes a transmitting unit 31 and a determining unit 32. The transmitting unit is configured to receive IS-IS protocol packets sent by other network nodes 30 in a BVLAN, where all network nodes 30 in the BVLAN support transmission of IS-IS protocol packets. After the determining unit 32 determines a priority of the network node 30 where it is located in the BVLAN, the transmitting unit 31 enables the network node 30 where it is located to transmit uniform configuration information in the BVLAN according to the priority of the network 30, where the uniform configuration information is information that needs to be configured on each network node 30 in the BVLAN. Optionally, the uniform configuration information includes a mapping relationship between a backbone virtual local area network (BVLAN) and an equal cost tree algorithm, and a mapping relationship between an I-component service identity and the backbone virtual local area network (BVLAN).

Usually, the determining unit 32 may determine the priority of the network node 30 where it is located in the BVLAN based on priority information carried in the IS-IS protocol packets. For example, the priority information may be a priority TLV. That is, the priority TLV is added to an IS-IS protocol packet transmitted in the BLVAN, and the network node notifies its own priority to other network nodes when broadcasting the IS-IS protocol packet. That is to say, for a certain network node 30, because it is capable of receiving IS-IS protocol packets of other network nodes 30 except itself, after comparing the priority TLVs in the received IS-IS protocol packets of the other network nodes 30 with its own priority TLV, it may know its own priority in the entire BVLAN. When the determining unit 32 determines that the priority of the network node 30 where it is located is the highest in the BVLAN, the network node 30 is referred to as a master node. Therefore, the transmitting unit 31 sends the uniform configuration information to other network nodes 30. Otherwise, when the determining unit 32 determines that the priority of the network node 30 where it is located is not the highest in the BVLAN, the network node 30 is referred to as a slave node, then the transmitting unit 31 receives the uniform configuration information sent by a network node 30 serving as the master node.

It can be seen that, the network node in the embodiment of the present disclosure has an auto-configuration feature, thereby improving a speed and accuracy of network configuration.

Figure 4:
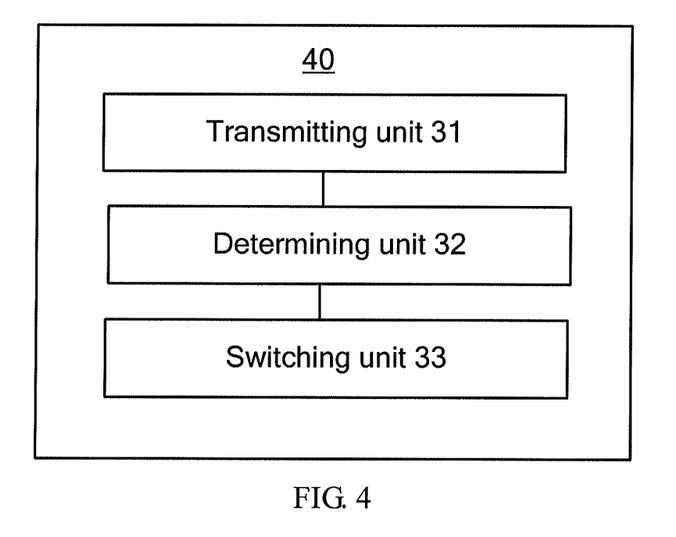
FIG. 4 is a schematic structural diagram of a network node according to another embodiment of the present disclosure.

FIG. 4 shows a network node according to another embodiment of the present disclosure. The network node has a feature of synchronous configuration switching.

As shown in FIG. 4, in addition to a transmitting unit 31 and a determining unit 32, the network node 40 further includes a switching unit 33. The switching unit 33 enables the network node 40 where it is located to perform configuration switching according to the uniform configuration information, that is, to change old uniform configuration information to the uniform configuration information obtained in transmission.

Specifically speaking, when the network node 40 is a slave node, after the transmitting unit 31 receives acknowledgment information that is sent by all other slave nodes except the network node 40 where it is located, and is used for indicating that the uniform configuration information is received, the switching unit 33 performs configuration switching according to the received uniform configuration information. Alternatively, when the network node 40 is a master node and the transmitted uniform configuration information is different from current configuration information of the network node 40, after the transmitting unit 31 of the network node 40 receives the acknowledgment information that is sent by all other slave nodes except the network node 40 and is used for indicating that the uniform configuration information is received, the switching unit 33 performs the configuration switching according to the uniform configuration information. Otherwise, when the network node 40 is a master node and the uniform configuration information is the configuration information of the network node 40, the network node 40 which serves as the master node does not perform the configuration switching.

In conclusion, the network node in the embodiment of the present disclosure has the feature of synchronous configuration switching in addition to an auto-configuration feature, thereby reducing service interruption time during configuration and ensuring the synchronous configuration switching of all the network nodes.

Forming of a system for auto-configuration according to an embodiment of the present disclosure is described below in detail with reference to FIG. 5.

Figure 5:
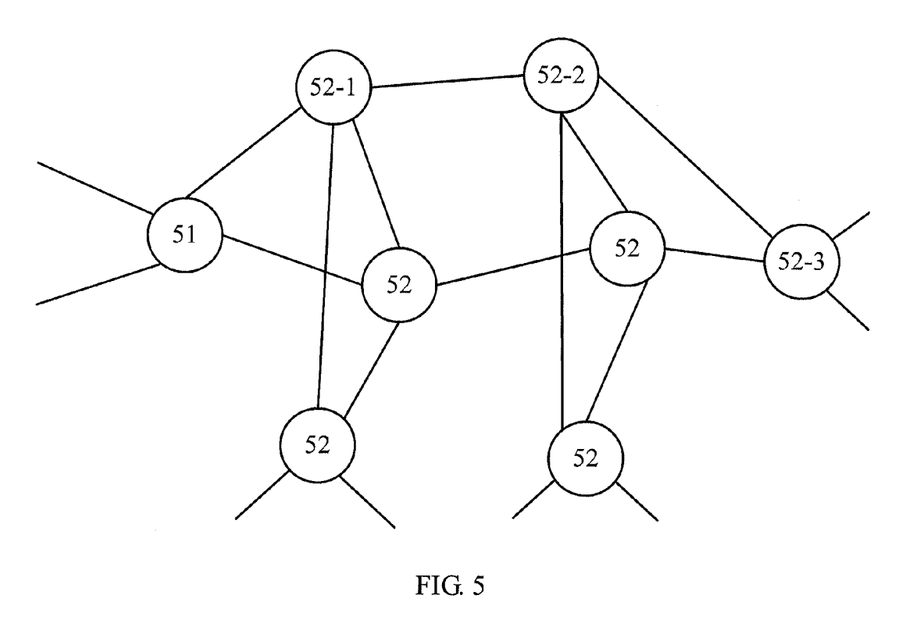
FIG. 5 is a schematic structural diagram of a system for auto-configuration according to an embodiment of the present disclosure.

As shown in FIG. 5, an auto-configuration system 50 includes a master node 51 and one or multiple slave nodes 52. The master node 51 and the one or multiple slave nodes 52 form an independent BVLAN, and all network nodes in the BVLAN support transmission of IS-IS protocol packets. Because all the network nodes in the BVLAN support the IS-IS protocol, the BVLAN may use the IS-IS protocol packets to carry information that needs to be configured on all the network nodes in the BVLAN, namely, uniform configuration information, so as to implement auto-configuration of the entire network by using the uniform configuration information. For example, the uniform configuration information includes a mapping relationship between the BLVAN and an equal cost tree algorithm, and a mapping relationship between an I-component service identity and the BVLAN.

The master node 51 is a network node having a highest priority. For example, the master node 51 may be determined by a network management system, that is, by designating a priority of a certain network node as the highest priority. Alternatively, the master node 51 may be determined in an automatic manner, for example, carrying priority information (such as a priority TLV) in the IS-IS protocol packets transmitted in the BVLAN, so that a network node in the BVLAN may determine whether it is a master node or a slave node according to the priority information. Specifically speaking, a new priority TLV is added in the IS-IS protocol packet by a network node, and the priority TLV is used to indicate the priority of the network node. Therefore, according to IS-IS protocol packets sent by other network nodes except itself, each network node may determine its own priority in the network by comparing the priority TLVs in the IS-IS protocol packets with its own priority TLV. When a certain network node finds that it has the highest priority, it determines itself as the master node; if it finds that a network node whose priority is higher than its own priority, it is determines itself as a slave node.

Because the master node 51 has qualification to advertise configuration to the entire network, the master node 51 may send the uniform configuration information to all the slave nodes 52 through an IS-IS protocol packet.

For the uniform configuration information, it may be considered that the uniform configuration information is statically set on the master node 51, or the master node 51 directly uses its own currently configuration information as the uniform configuration information, and then transmits the uniform configuration information to the slave nodes 52 through the IS-IS protocol packet, so that the slave node 52 implements the same configuration as the master node 51 according to the received uniform configuration information. The master node 51 completes automatic sending of the uniform configuration information, which obviously reduces configuration time as compared with manual configuration.

In addition, to reduce service interruption time during a configuration process and decrease a configuration error rate, all the network nodes may synchronously perform configuration switching, that is, change old uniform configuration information to the uniform con figuration information obtained in transmission.

Configuration switching situations of the master node 51 and each slave node 52 are illustrated below, respectively.

After receiving the uniform configuration information, a slave node 52 carries acknowledgment information in an IS-IS protocol packet sent to other slave nodes, where the acknowledgment information is used to acknowledge the uniform configuration information.

For the master node 51, if the uniform configuration information is the current configuration information of the master node 51, the master node 51 does not need to perform the configuration switching. However, if the uniform configuration information is new configuration information that is set statically, the master node 51 does not perform configuration switching first, and after receiving the acknowledgment information sent by all the slave nodes, performs the configuration switching together with all the slave nodes 52 according to the uniform configuration information.

Each slave node 52 performs the configuration switching according to the uniform configuration information only after it receives the acknowledgment information sent by all other slave nodes except itself.

As described in the foregoing, a synchronous switching mechanism is that from initiating the configuration switching to completing the configuration switching, old configuration of each network node still exists, and a service is not interrupted. Each network node switches from the old configuration to new configuration according to the uniform configuration information only after determining that other network nodes are also capable of performing the configuration switching. Obviously, minimum service interruption time is achieved when the synchronous switching mechanism is adopted to perform the configuration switching.

In addition, to improve stability of the auto-configuration, it may be considered that one or multiple slave nodes 52 are selected to serve as standby nodes of the master node 51, namely, standby master nodes 52-1. Usually, a priority of a standby master node is lower than a priority of the master node but is higher than priorities of other slave nodes except the standby master node, so that when the master node 51 is faulty, the standby master node 52-1 with a second highest priority is raised to a master node. At the same time, a standby master node 52-2 may also be selected for the new master node, so as to ensure smooth auto-configuration.

Alternatively, multiple standby master nodes may be selected for the master node 51 first, for example, 52-1 and 52-2, where a priority of 52-1 is lower than that of the master node 51 but is higher than those of other slave nodes; a priority of 52-2 is lower than that of 52-1 but is higher than those of other slave nodes. When the master node 51 is faulty, the standby master node 52-1 is raised to be a master node, and at the same time the standby master node 52-2 becomes a standby master node of the new master node 52-1. In addition, a slave node 52-3 needs to be selected additionally to serve as a standby master node of the new master node 52-1, where a priority of the slave node 52-3 is lower than that of 52-2 but is higher than that of other slave nodes.

In conclusion, the system for auto-configuration in the embodiment of the present disclosure may perform the auto-configuration, thereby improving a speed and accuracy of the configuration. The system for auto-configuration may further reduce the service interruption time and ensure synchronous configuration switching of all the network nodes.

Persons of ordinary skill in the art may realize that, units and algorithm steps of each example described in combination with the embodiments disclosed here may be implemented by electronic hardware or a combination of computer software and electronic hardware. Whether these functions are executed in a hardware or software manner depends upon a particular application and design constraint condition of the technical solutions. Persons skilled in the art may use different methods to implement the described functions for each particular application, but the implementation should not be construed as beyond the scope of the present disclosure.

Persons skilled in the art may clearly understand that, for convenience and briefness of description, reference may be made to corresponding processes in the foregoing method embodiments for detailed working processes of the foregoing system, apparatus and units, which are not repeatedly described here.

In the several embodiments provided in this application, it should be understood that the disclosed system, apparatus, and method may be implemented in other manners. For example, the foregoing described apparatus embodiments are merely exemplary. For example, the unit division is merely logical function division and there may be other division manners in actual implementation. For example, multiple units or components may be combined or may be integrated into another system, or some characteristics may be ignored or not executed. Furthermore, the shown or discussed mutual coupling or direct coupling or communication connection may be indirect coupling or communication connection between some interfaces, apparatuses, or units, and may be electrical, mechanical, or in other forms.

The units described as separate components may be or may not be physically separated. Components shown as units may be or may not be physical units, that is, may be located at one position or scattered at multiple network units. Part of or all of the units may be selected according to an actual need to achieve the objectives of the solutions of the embodiments.

In addition, various functional units according to each embodiment of the present disclosure may be integrated in one processing unit or may exist as various independent physical units; alternatively, two or more than two units may be integrated in one unit.

When implemented in the form of a software functional unit and sold or used as an independent product, the functions may be stored in a computer readable storage medium. Based on such understanding, the nature of the technical solutions of the present disclosure, or a part that makes contribution to the prior art, or part of the technical solutions, may be embodied in the form of a software product. The computer software product is stored in a storage medium, and includes several instructions to enable a computer equipment (such as a personal computer, a server, or a network equipment) to perform all or part of the steps of the methods according to each embodiment of the present disclosure. The storage medium includes various media capable of storing program codes, such as a USB flash disk, a removable hard disk, a read-only memory (ROM, Read-Only Memory), a random access memory (RAM, Random Access Memory), a magnetic disk or a compact disk.

The foregoing descriptions are merely specific implementation manners of the present disclosure, but not intended to limit the protection scope of the present disclosure. Any variation or replacement that may be easily thought of by persons skilled in the art without departing from the technical scope disclosed in the present disclosure shall fall within the protection scope of the present disclosure. Therefore, the protection scope of the present disclosure is subject to the protection scope of the appended claims.

What is claimed is:

1. A method for auto-configuration, comprising:
receiving, by a network node in a backbone virtual local area network (BVLAN), extended intermediate system to intermediate system routing protocol (IS-IS) protocol packets sent by other network nodes in the BVLAN; wherein an extended IS-IS protocol packet carries priority information of a network node that sends the extended IS-IS protocol packet;
determining, by the network node, its own priority in the BVLAN based on the priority information carried in the extended IS-IS protocol packets;
transmitting, by the network node, uniform configuration information in the BVLAN according to its own priority, wherein the uniform configuration information is information that needs to be configured on each network node in the BVLAN; and
performing, by the network node, configuration switching according to the uniform configuration information, after it is determined that each network node in the BVLAN has obtained the uniform configuration information and is able to perform the configuration switching;
wherein the network node is a hardware network node;
wherein the transmitting step comprises:
sending, by the network node, the uniform configuration information to the other network nodes in the BVLAN when the priority of the network node is the highest in the BVLAN; and
receiving, by the network node, the uniform configuration information when the priority of the network node is not the highest in the BVLAN;
wherein the performing step comprises:
when the priority of the network node is not the highest, after receiving acknowledgment information that is sent by all other network nodes whose priorities are not the highest except the network node, and is used for indicating that the uniform configuration information is received, performing, by the network node, the configuration switching according to the uniform configuration information; or
when the priority of the network node is the highest and the uniform configuration information is different from current configuration information of the network node, after receiving acknowledgment information that is sent by all other network nodes whose priorities are not the highest except the network node, and is used for indicating that the uniform configuration information is received, performing, by the network node, the configuration switching according to the uniform configuration information,
wherein the uniform configuration information comprises a mapping relationship between the BVLAN and an equal cost tree algorithm, and a mapping relationship between an I-component service identity and the BVLAN.

2. The method according to claim 1, wherein the priority information comprises a priority type-length-value (TLV); and wherein all network nodes in the BVLAN support the IS-IS protocol packets.

3. A hardware network node, comprising a processor configured to:
receive extended intermediate system to intermediate system routing protocol (IS-IS) protocol packets sent by other network nodes in a backbone virtual local area network (BVLAN), wherein all the network nodes in the BVLAN support transmission of the extended IS-IS protocol packets; wherein extended IS-IS protocol packet carries priority information of a network node that sends the extended IS-IS protocol packet;
determine a priority of the network node in the BVLAN based on the priority information carried in the extended IS-IS protocol packets;
transmit uniform configuration information in the BVLAN according to the priority, wherein the uniform configuration information is information that needs to be configured on each network node in the BVLAN; and
perform configuration switching according to the uniform configuration information, after it is determined that each network node in the BVLAN has obtained the uniform configuration information and is able to perform the configuration switching;
wherein when transmitting uniform configuration information, the processor is further configured to:
send the uniform configuration information to the other network nodes in the BVLAN when determining that the priority of the network node is the highest in the BVLAN; and
receive the uniform configuration information when determining that the priority of the network node is not the highest in the BVLAN; and
wherein when performing configuration switching, the processor is further configured to:
when the priority of the network node is not the highest, after receiving acknowledgment information that is sent by all other network nodes whose priorities are not the highest except the network node, and is used for indicating that the uniform configuration information is received, perform the configuration switching according to the uniform configuration information; or
when the priority of the network node is the highest and the uniform configuration information is different from current configuration information of the network node, after receiving acknowledgment information that is sent by all other network nodes whose priorities are not the highest except the network node, and is used for indicating that the uniform configuration information is received, perform the configuration switching according to the uniform configuration information,
wherein the uniform configuration information comprises a mapping relationship between the BVLAN and an equal cost tree algorithm, and a mapping relationship between an I-component service identity and the BVLAN.

4. The network node according to claim 3, wherein the priority information comprises a priority type-length-value (TLV).

5. A system for auto-configuration, comprising:
a master node; and
one or multiple slave nodes, wherein
the master node and the one or multiple slave nodes are hardware network nodes;
the master node and the one or multiple slave nodes are located in an independent backbone virtual local area network (BVLAN), all network nodes in the BVLAN support transmission of extended intermediate system to intermediate system routing protocol (IS-IS) protocol packets; wherein an extended IS-IS protocol packet carries priority information of a network node that sends the extended IS-IS protocol packet;
the master node has a highest priority, and sends uniform configuration information to the one or multiple slave nodes through an IS-IS protocol packet, wherein the uniform configuration information is information that needs to be configured on all the network nodes in the BVLAN; and
each of the master node and the one or multiple slave nodes is configured to perform configuration switching according to the uniform configuration information, after it is determined that each network node in the BVLAN has obtained the uniform configuration information and is able to perform the configuration switching;
wherein the master node performs configuration switching according to the uniform configuration information comprises:
when the uniform configuration information is different from current configuration information of the master node, after the master node receives acknowledgment information that is sent by all the slave nodes and used for indicating that the uniform configuration information is received, the master node performs the configuration switching according to uniform configuration information;

wherein the one or multiple slave nodes perform the configuration switching according to the uniform configuration information comprises:

when each slave node receives acknowledgment information that is sent by all other slave nodes except itself and used for indicating that the uniform configuration information is received, the each slave node performs the configuration switching according to the uniform configuration information, wherein the uniform configuration information comprises a mapping relationship between the BLVAN and an equal cost tree algorithm, and a mapping relationship between an I-component service identity and the BVLAN.

6. The system according to claim 5, wherein the one or multiple slave nodes further comprise:

a standby master node, wherein a priority of the standby master node is higher than priorities of other slave nodes except the standby master node, so that when the master node is faulty, the standby master node becomes a master node.

\* \* \* \* \*